UNITED STATES PATENT OFFICE.

ROBERT E. HUMPHREYS, OF WHITING, INDIANA, ASSIGNOR TO STANDARD OIL COMPANY, OF WHITING, INDIANA, A CORPORATION OF INDIANA.

PROCESS OF REFINING MINERAL PETROLEUM-OILS.

1,286,179. Specification of Letters Patent. Patented Nov. 26, 1918.

No Drawing. Application filed May 17, 1915. Serial No. 28,572.

*To all whom it may concern:*

Be it known that I, ROBERT E. HUMPHREYS, a citizen of the United States, residing at Whiting, in the county of Lake and State of Indiana, have invented new and useful Improvements in Processes of Refining Mineral Petroleum-Oils, of which the following is a specification.

My invention relates to improvements in the art of refining petroleum oils. More particularly the invention is concerned with that stage of the refining process in which the oils are treated with sulfuric acid in order to remove unsaturated hydrocarbons.

According to the previously known methods of oil refining it has been customary to treat the oils subsequent to their distillation with concentrated or fuming sulfuric acid. After such treatment the body of mixed oil and acid is allowed to remain quiescent until a separation takes place, the purified oil slowly forming an upper stratum or layer, and the acid sludge, that is the pure acid and a large proportion of the sulfo-acids (so-called) formed by the reaction of the acid upon the hydrocarbons of the oil, settling to the bottom as a lower layer. When the stratification takes place the acid sludge may be drawn off, or the oil may be decanted, whereby a primary separation is effected.

It is found, however, that the upper layer, *i. e.*, the refined oil, contains a perceptible and objectionable percentage of sulfo-acids, which must be removed before the oil is suited for ordinary commercial use, and it is with the removal of these dissolved sulfo-acids that I am most particularly concerned.

I have discovered that if the oil, subsequent to the drawing off of the acid sludge, be treated with a small quantity of an alkali, alkaline earth, or other reagent having a basic reaction, for instance sodium hydroxid or carbonate milk of lime, etc., the sulfo-acids may be completely neutralized, that is, converted into salts. This neutralizing of the acids in the oil I regard as an important feature of my invention, since it permits of the use of ordinary iron or steel tanks, pipes and other apparatus, which would be quickly destroyed if the oil were permitted to remain acid. The next step in my process consists in removing the dissolved alkali salts of the sulfo-acids and for this purpose I have discovered that a dilute solution of a water-soluble organic solvent, such as alcohol or acetone may be satisfactorily employed. A fifty per cent. solution of methyl alcohol I find to give good results when used for this purpose.

My improved process for the refining of petroleum oils may therefore be said to consist essentially of the following steps:

1. Treating the oil with concentrated sulfuric acid.
2. Effecting a primary separation by drawing off the acid sludge.
3. Neutralizing the dissolved sulfo-acids, as by treatment with an alkali.
4. Extracting the resultant alkali salts of the sulfo-acid with a dilute water solution of a solvent, such as alcohol or acetone.

While I have described in some detail the manner in which I prefer to carry out my improved process, it is to be understood that such description is illustrative only, and for the purpose of making my invention more clear, and I do not regard my invention as limited to the specific steps or materials mentioned except in so far as I have included such limitations within the terms of the appended claims.

What I claim as new and desire to secure by Letters Patent is:

1. The herein described process of refining oils which consists in first treating a body of the oil with concentrated sulfuric acid, then drawing off the acid sludge, leaving an oil body containing a small percentage of sulfonic acid in solution, then neutralizing the said oil body and extracting the resultant dilute mineral oil solution of the salts with a dilute solution of water soluble solvent.

2. The herein described process of refining oils which consists in first treating a body of the oil with concentrated sulfuric acid, then drawing off the acid sludge leaving an oil body containing a small percentage of sulfonic acid in solution, then neutralizing the said oil body with an alkali, and extracting the resultant dilute mineral oil solution of the alkali salts with a dilute solution of a water soluble solvent.

3. The herein described process of refining oils which consists in first treating a body of the oil with concentrated sulfuric acid, then drawing off the acid sludge leaving an oil body containing a small percentage of sulfonic acid in solution, then neutralizing the said oil body with an alkali, and extracting the resultant dilute mineral oil solution of the alkali salts with a dilute solution of alcohol.

4. The herein described process of refining oils which consists in first treating a body of the oil with concentrated sulfuric acid, then drawing off the acid sludge leaving an oil body containing a small percentage of sulfonic acid in solution, then neutralizing the said oil body with sodium hydroxid, and extracting the resultant dilute mineral solution of the alkali salts with a dilute solution of a water soluble solvent.

5. The herein described process of refining oils which consists in first treating a body of the oil with concentrated sulfuric acid, then drawing off the acid sludge leaving an oil body containing a small percentage of sulfonic acid in solution, then neutralizing the said oil body with sodium hydroxid, and extracting the resultant dilute mineral oil solution of the alkali salts with a dilute solution of alcohol.

In testimony whereof I have hereunto set my hand this 29th day of April, A. D. 1915.

ROBERT E. HUMPHREYS.

In presence of two subscribing witnesses:
D. C. Thorsen,
A. C. Fischer.